United States Patent [19]

Nowak et al.

[11] 4,172,157

[45] Oct. 23, 1979

[54] AMINOPLAST/ALKYD COATING COMPOSITION

[75] Inventors: Michael T. Nowak, Westfield; John P. Walsh, New Providence, both of N.J.

[73] Assignee: Celanese Corporation, New York, N.Y.

[21] Appl. No.: 943,910

[22] Filed: Sep. 19, 1978

[51] Int. Cl.² .............................................. B05D 3/06
[52] U.S. Cl. .................................. 427/54; 204/159.15; 204/159.21; 204/159.24; 427/44; 525/514; 549/87
[58] Field of Search .............. 427/44, 54; 204/159.19, 204/159.21, 159.24; 260/850, 851, 856, 332.1

[56] References Cited

U.S. PATENT DOCUMENTS

| | | | |
|---|---|---|---|
| 3,476,709 | 11/1969 | Jones | 260/332.1 |
| 3,647,520 | 3/1972 | Gor et al. | 204/159.21 |
| 3,650,927 | 3/1972 | Levinos | 204/159.24 |
| 3,703,454 | 11/1972 | Nakase et al. | 204/159.21 |
| 4,125,678 | 11/1978 | Stuan et al. | 427/54 |
| 4,129,681 | 12/1978 | Anderson et al. | 260/856 |

*Primary Examiner*—John H. Newsome

[57] ABSTRACT

This invention provides an acid-hardening resin composition which is activated by exposure to actinic light, wherein the composition is a condensation polymerizable blend of (1) an aminoplast, (2) an alkyd resin; and (3) a sulfolene catalyst.

When the invention coating composition is subjected to ultraviolet light exposure and a subsequent bake cycle, a film is obtained which has good mechanical properties and excellent adherence to substrates. In a further embodiment, a superior substantially 100% solids coating system is provided which comprises (1) an aminoplast; (2) an alkyd resin; (3) a sulfolene catalyst; (4) a photoinitiator; and (5) a polymerizable olefinically unsaturated monomer or prepolymer.

10 Claims, No Drawings

008# AMINOPLAST/ALKYD COATING COMPOSITION

BACKGROUND OF THE INVENTION

In the manufacture of metal containers, a protective organic coating is applied to the side of the metal sheet which is to form the interior of the container. The materials which are employed for coating the metal generally are heat curable resinous materials which are applied as a solution or dispersion in a volatile organic solvent. The coated metal surface is passed through an oven in which hot air is circulated to evaporate the solvent and to cure the coating film to the desired thermoset hardness.

This procedure is relatively slow, and there are the attendant disadvantages of troublesome odor, fire hazard and health threat, and high energy requirements.

A number of other coating compositions are known which are free of a volatile solvent, but which exhibit other properties which are undesirable and disadvantageous. A plastisol, such as polyvinyl chloride, provide coatings which are insufficiently resistant to the action of chemicals and solvents. Epoxy systems, which can be employed without a solvent, have numerous disadvantages. In addition to the health dangers and troublesome odors caused by the curing agents employed, epoxy systems have the additional disadvantage of a short processing time of coating mixtures, which causes handling difficulties and necessitates the use of two-component spray guns.

Similar disadvantages are exhibited by unsaturated polyester resins, such as short processing cycles and air-sensitivity of the curing reaction. The polyurethane coating systems have the disadvantage of being a health hazard because of the isocyanate content. Also, the systems suffer from high sensitivity to water, which results in the formation of faults and bubbles in the coatings if water is not rigorously excluded.

For the foregoing reasons, research effort has been dedicated to the development of aminoplast-based solvent-free coating systems. Such aminoplast coatings are often characteristically brittle and inelastic, and may exhibit other undesirable properties such as poor adherence to metals and unsatisfactory mechanical properties. Also, aminoplast resin blends with conventional varnish resins have the disadvantage of high viscosity, and in many cases, limited compatibility between the resin components.

Accordingly, it is a main object of the present invention to provide a low viscosity coating composition which cures as a substantially 100 percent solids thermoset film exhibiting a desirable combination of hardness and flexibility.

It is another object of this invention to provide an aminoplast coating system which cures rapidly to yield protective films with excellent adherence to metal substrates, and which exhibit a desirable combination of hardness and elasticity.

It is a further object of this invention to provide an acid-hardening condensation polymerizable aminoplast/alkyd resin composition which has a thermal stability gel time of at least 10 days at a temperature of 120° F.

Other objects and advantages shall become apparent from the accompanying description and examples.

DESCRIPTION OF THE INVENTION

One or more objects of the present invention are accomplished by the provision of an acid-hardening resin composition which is activated by exposure to actinic light, said composition comprising a blend of (1) condensation polymerizable aminoplast; (2) condensation polymerizable alkyd resin; and (3) a sulfolene catalyst.

In one embodiment, the condensation polymerizable composition described above is a coating system which contains a photoinitiator as an additional component.

In another embodiment, the condensation polymerizable composition described above is a coating system which contains a photoinitiator, and which has incorporated therein a quantity of polymerizable olefinically unsaturated monomer or prepolymer as an additional component.

Illustrative of a preferred embodiment of the present invention is a condensation polymerizable coating composition comprising a homogeneous liquid blend of (1) between about 20 and 50 weight percent of aminoplast or aminoplast precursor, (2) between about 50 and 80 weight percent of residual hydroxycontaining alkyd resin, (3) between about 0.5 and 15 weight percent of a sulfolene catalyst; and (4) between about 0.1 and 10 weight percent of a photoinitiator; based on total aminoplast/alkyd resin weight.

A condensation polymerizable composition of the present invention can be prepared by the simple expediency of blending the selected components at room temperature to form a homogeneous coating medium. In the manner of conventional coating systems, a present invention condensation polymerizable composition can also contain immiscible polymeric or non-polymeric organic or inorganic fillers, pigments or reinforcing agents, e.g., silica, organophilic silica, bentonite, powdered glass, colloidal carbon, titanium dioxide, and the like.

AMINOPLAST COMPONENT

The aminoplast component employed can be any of the aldehyde condensation products of compounds such as melamine, urea, dicyandiamide, benzoquanamine, and the like; and mixtures and etherified derivatives of these condensation products.

Procedures for preparing aminoplasts are described in *Aminoplasts*, C.P. Vale (Cleaver-Hume Press, Ltd., London). Further illustration of aminoplast preparation and application is set forth in U.S. Pat. Nos. 2,957,835 3,501,429; 3,522,159; 3,535,148; 3,773,721; 3,852,375; 3,891,590; 3,954,715; 3,965,058; 3,979,478; 4,071,578; and the like.

The aldehyde used in preparation of the condensation aminoplasts may be (1) monofunctional or (2) polyfunctional, having at least two aldehyde groups separated by at most one carbon atom; such as formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid or mildly alkaline catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst.

These aldehyde condensation products (i.e., aminoplasts) contain methylol or similar alkylol groups, the structure of the alkylol group depending upon the particular aldehyde employed. All or part of these alkylol groups may be etherified by reaction with an alcohol. Among the preferred amine-aldehyde products for use in the present invention are those which are substantially alkylated by an etherification reaction, i.e., in which at least a major portion of the alkylol groups have been reacted with an alcohol. Essentially any monohydric alcohol can be employed for this purpose, including such alcohols as methanol, propanol, butanol, heptanol and other alkanols having up to about 12 carbon atoms or more, as well as benzyl alcohol and other aromatic alcohols, cyclic alcohols such as cyclohexanol, monoethers of glycols such as the Cellosolves and Carbitols, and halogen-substituted or other substituted alcohols, such as 3-chloro-propanol. The preferred alcohols are methanol, butanol, and similar lower alkanols.

The aldehyde is often employed as a solution in water or alcohol, and the condensation, polymerization and etherification reactions may be carried out either sequentially or simultaneously.

In an acid-hardening coating composition of the present invention, the aminoplast or aminoplast precursor component is employed in a quantity between about 20 and 50 weight percent, and preferably in a quantity between about 25 and 45 weight percent, based on the total weight of the aminoplast and alkyd resin components in the composition.

By the term "aminoplast precursor" is meant a mixture of aldehyde and amine compounds which yield an aminoplast under condensation conditions.

The aminoplast component of a present invention coating composition is capable of undergoing condensation polymerizable reaction with the alkyd resin component under acid-hardening conditions.

ALKYD RESIN COMPONENT

The alkyd resin component employed in a present invention composition can be any of the saturated or unsaturated alkyds utilized in the coatings field, produced from any polybasic acid and polyfunctional alcohol. For example, the alkyd may be made from such polyfunctional acids as phthalic acid, maleic acid, fumaric acid, isophthalic acid, succinic acid, adipic acid, azaleic acid, fatty acids and the like, as well as anhydrides of such acids. Among the polyols employed are glycerol, trimethylolethane, trimethylolpropane, pentaerythritol, sorbitol, mannitol, ethylene glycol, diethylene glycol, 2,3-butylene glycol, and similar alcohols. The alkyd resin may be oil-modified or non oil-modified, can contain in part a monobasic acid such as benzoic acid, and can be copolymerized with one or more other ethylenically unsaturated monomers. Such monomers include ethyl acrylate, methyl methacrylate and other esters of acrylic acid and methacrylic acid, acrylonitrile, olefinic hydrocarbons, and other polymerizable monomers.

The alkyd resin which are particularly preferred are those having an average molecule weight of 200-600 and containing predominantly hydroxyl groups as terminal groups, i.e., those which have been prepared with an excess of the alcohol reactant, and which are residual hydroxy-containing.

The alkyd resins can be prepared in accordance with standard procedures, e.g., with or without a catalyst, with or without the introduction of a stream of inert gas, as solution condensation, melt condensation or azeotropic esterification, at temperatures of up to 220° C. or higher, so that the water or the alkanols produced by the esterification are continuously removed. The esterification can be followed by measuring the hydroxyl and acid numbers. Esterification conditions are selected so that the reaction is as complete as possible, i.e., until the acid number, in case of ester charges of n mole of diol, m mole of polyol, and (n+m−1) moles of dicarboxylic acid, is smaller than 10 mg. KOH/g. The molecular weight of the esters can thus be regulated by the ratio of the initially charged amounts of alcohol reactant and dicarboxylic acid mixture.

The alkyd resin component of a present invention acid-hardening coating composition is employed in a quantity between about 50 and 80 weight percent, and preferably in a quantity between about 60 and 75 weight percent, based on the total weight of the alkyd resin and aminoplast components in the composition.

SULFOLENE CATALYST COMPONENT

It is a particular advantage of the present invention that a sulfolene compound is employed to catalyze the acid-hardening condensation polymerization between the aminoplast and alkyl resin components. It has been found that a sulfolene compound is superior to conventional acid catalysts, such as trichloroacetic acid, for the preparation of a present invention acid-hardening coating composition. As illustrated in Example VII, a coating composition containing sulfolene as a catalyst has greater thermal stability than a coating composition containing p-toluenesulfonic acid as a catalyst.

Further, it has been found that sulfolane is an ineffective catalyst for the practice of the present invention in comparison with the structurally related sulfolene compound.

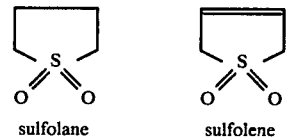

sulfolane    sulfolene

Sulfolene (i.e., butadiene sulfone) or substituted sulfolene is readily prepared by reacting a large molar excess of liquid butadiene or substituted butadiene with liquid sulfur dioxide under non-aqueous conditions, at pressures between 100-500 psi and temperature around 100° C.

Methods of preparing sulfolene and substituted sulfolene are described in U.S. Pat. Nos. 2,395,050; 2,402,891; 2,420,834; 2,443,270; 3,077,479; 3,822,286; and the like. The use of sulfolene compounds for acid catalysis is disclosed in U.S. Pat. Nos. 3,326,868 and 3,800,013.

Sulfolene compounds suitable for the practice of the present invention include those prepared by the reaction of sulfur dioxide with conjugated diene monomers such as butadiene-1,3; 2-methyl butadiene-1,3; pentadiene-1,3; 2,3-dimethyl butadiene-1,3; 2,3-diethyl butadiene-1,3; 1,2,3,4-tetramethyl butadiene-1,3; 1,4-dimethyl-2,3-diethyl butadiene-1,3; 2-methyl pentadiene-1,3; 4-methyl pentadiene-1,3; 2-methyl hexadiene-1,3; 4-ethyl hexadiene-1,3; cyclopentyl butadienes; cyclohexyl butadienes; 2-chlorbutadiene-1,3; 2-methyl-3-chlorbutadiene-1,3; 3-methoxybutadiene-1,3; and the like.

The sulfolene catalyst component of a present invention acid-hardening coating composition is employed in a quantity between about 0.5 and 15 weight percent, and preferably in a quantity between about 1 and 10 weight percent, based on the total weight of aminoplast and alkyd resin components in the composition.

PHOTOINITIATOR COMPONENT

In general, a conventional photoinitiator derivative is suitable for incorporation in a present invention acid-hardening coating composition.

The photoinitiator component is selected to provide a fast cure response when the curable coating composition is exposed to low energy activation from a light source having a wavelength in the range between about 2000 and 6000 angstroms. Suitable light sources are sunlamps, mercury arcs, carbon arcs, tungsten filament lamps, xenon arcs, krypton arcs, and the like. The radiation emitting source is preferably within about twelve inches of the coating surface being cured. The cure response is initiated usually in less than about 5 seconds with ultraviolet radiation at room temperature.

The photoinitiator component can be added as a single compound or a mixture of compounds. Illustrative of suitable photoinitiator compunds are those disclosed in Chemical Reviews, 68 (No. 2), 125 (1968), and in U.S. Pat. Nos. 3,840,390; 3,864,133; and the like. Typical photoinitiator compounds include acyloin and derivatives thereof, such as benzoin, benzoin methyl ether, benzoin ethyl ether, benzoin isopropyl ether, benzoin isobutyl ether, desyl bromide, and α-methylbenzoin; diketones such as benzil and diacetyl, etc.; organic sulfides such as diphenyl monosulfide, diphenyl disulfide, desyl phenyl sulfide, and tetramethylthiuram monosulfide; S-acyl dithiocarbamates, such as S-benoyl-N,N-dimethyldithiocarbamate and S-(p-chloro-benzoyl)-n,N-dimethyldithiocarbamate; phenones such as acetophenone, α,α,α-tribromoacetophenone, o-nitro-α,α,α-tribromoacetophenone, benzophenone, and p,p'-tetramethyldiaminobenzophenone; sulfonyl halides such as p-toluenesulfonyl chloride; and the like.

If desired, an amine can also be incorporated in an invention curable coating composition to accelerate the rate of curing by light radiation when the photoinitiator is an aryl ketone. Amines that exhibit this synergistic rate-enhancing effect include triethanolamine, tributylamine, triethylamine, and the like.

The photoinitiator component of a present invention acid-hardening coating composition is employed in a quantity between about 0.1 and 10 weight percent, and preferably in a quantity between about 1 and 6 weight percent, based on the total weight of aminoplast and alkyd resin components in the composition.

OPTIONAL POLYMERIZABLE COMPONENT

As previously indicated hereinabove, in a preferred embodiment a present invention acid-hardening coating composition can include a quantity of polymerizable olefinically unsaturated monomer or prepolymer as an additional component.

A preferred polymerizable component is one which functions as a low viscosity solubilizing medium for the other organic components, and which polymerizes readily without volatilizing when the coating composition is subjected to ultraviolet radiation curing conditions.

Suitable polymerizable compounds include vinyl acetate, vinyl butyrate, butyl acrylate, divinylbenzene, allyl methacrylate, diethylene glycol dimethacrylate, ethylene glycol dimethacrylate, trimethyolopropane trimethacrylate, diallyl adipate, methylene-bis-acrylamide, diethylene glycol diacrylate, ethylene glycol diacrylate, diallyl fumarate, diallyl phthalate, divinyl sulfone, butylene dimethacrylate, trimethylene glycol diacrylate, butylene glycol diacrylate, pentamethylene glycol diacrylate, glyceryl triacrylate, octylene glycol diacrylate, the tetraacrylate ester of pentaerythritol, ethyl diallylphosphonate, triallylisocyanurate, and the like.

A preferred class of polymerizable compounds are those which are liquid at 25° C., and which contain 2–4 polymerizable olefinically unsaturated groups and have a molecular weight in the range between about 120 and 600. Highly preferred polymerizable compounds for the purposes of this invention include trimethylolpropane triacrylate and trimethylolpropane trimethacrylate.

The said optional polymerizable component of a present invention acid-hardening coating composition is employed in a quantity between about 2 and 30 weight percent, and a preferably in a quantity between about 5 and 25 weight percent, based on the total weight of the aminoplast and alkyd resin components in the composition.

COATING AND CURING PROCEDURES

The coating of substrates with an invention resin composition is accomplished by conventional application techniques such as spraying, dipping, curtain and roll coating, and the like.

The coated substrate is exposed to electromagnetic radiation having a wavelength above about 2000 angstroms and up to about 6000 angstroms. The optimal exposure time will vary, depending on such factors as film thickness, temperature, radiation power, and the like. Generally, with a mercury vapor radiation power of about 200 watts per linear inch set at a distance of 12 inches from the coating surface, cure response is initiated within about 5 seconds, and in most cases within about 2 seconds.

It has been demonstrated that superior film properties are obtained if a present invention coating is irradiated with actinic light in a first step, and then subjected to a heat treating cycle in a second step.

It is particularly noteworthy that no curing can be achieved if a present invention coating is not exposed to ultraviolet radiation prior to a heat-treating cycle (e.g., 5 minutes at 150° C.). This is in contrast to conventional acid-hardening resin coating systems. The sulfolene catalyst component of the present invention coating compositions requires photoinitiation before it can induce the condensation polymerization reaction between the aminoplast and alkyd resin components.

The following examples are further illustrative of the present invention. The reactants and other specific ingredients are presented as being typical, and various modifications can be devised in view of the foregoing disclosure within the scope of the invention.

EXAMPLE I

Preparation Of Alkyd Resin

A mixture of 65.1 grams of ethylene glycol (1.0 mole), 79.8 grams of 1,2-propanediol (1.0 mole), 74 grams of phthalic anhydride (0.5 mole) and 73 grams of adipic acid (0.5 mole) is heated under a nitrogen atmosphere over a period of 16 hours. During the heating period the temperature is increased gradually from 140° C. to 200° C. Approximately 25 milliliters of water is separated during the reaction period.

A colorless ester mixture is recovered which has an acid number of about 2.5 milligrams KOH/gram (average M.W. of 245).

EXAMPLE II

Preparation of an Acrylic-Modified Hydroxy-Containing Alkyd

An alkyd resin is prepared which is composed of the following combination of monomers:

|  | Mole Ratio | Weight % |
|---|---|---|
| Pentaerythritol | 2.0 | |
| 1,6-Hexanediol | 9.0 | 30 |
| Phthalic Anhydride | 10.0 | |
| Methyl Methacrylate | 1.0 | |
| Ethyl Acrylate | 2.0 | |
| Hydroxyethyl Acrylate | 0.1 | 70 |
| Acrylic Acid | 0.1 | |

A reaction vessel is charged with xylene and dicumyl peroxide, and the charge is heated to reflux. The mixture of acrylic monomers listed above is added dropwise to the refluxing reaction medium. After the addition of the monomer mixture is completed, more dicumyl peroxide in xylene is introduced and the reflux is continued for an additional brief reaction period.

Then as a catalyst there is added dibutyltin oxide dissolved in a minimal quantity of water. This is followed by the sequential addition of 1,6-hexanediol, phthalic acid and pentaerythritol.

After a reflux period of several hours, the solvent is distilled off and the acrylic-modified alkyd product is recovered.

EXAMPLE III

Preparation Of An Aminoplast

To a reaction vessel equipped with thermometer, stirrer and reflux condenser, are charged 270 grams of formaldehyde dissolved in 510 grams of water. The pH of the reaction medium is adjusted to 8.5 with sodium hydroxide, then 126 grams of melamine are added over a period of two hours at a reaction medium temperature of 50° C. The temperature is maintained at 50° C. for three hours after the addition of the melamine is completed. The pH is adjusted to 9.5, and the solid methylolmelamine product which forms is recovered by filtration.

EXAMPLE IV

Preparation Of An Etherified Aminoplast

The methylolmelamine product of Example II is charged to a reaction vessel, and to the charge is added 480 grams of methanol while the reaction medium is maintained at about 35° C. by cooling. The pH of the reaction medium is adjusted to 3.0 with sulfuric acid.

Agitation is continued until all of the suspended solids are completely dissolved, then the pH of the reaction medium is adjusted to 9.0 with sodium hydroxide. The reaction medium is vacuum distilled to remove unreacted methanol, formaldehyde and other volatiles. Toluene is added to azeotrope out residual traces of water.

At normal pressure, 480 grams of methanol are added to the reaction vessel contents with cooling to 35° C. The pH is adjusted to 3.0 with sulfuric acid, and the reaction medium is maintained at 35° C. for about three hours. The pH is adjusted to 9.0 with sodium hydroxide, and then the reaction medium is subjected to vacuum distillation to remove volatiles from the resultant methoxymethylmelamine product.

EXAMPLE V

Preparation Of Aminoplast/Alkyd Coatings

Aminoplast/alkyd resin coating compositions are prepared by admixing the following components in the proportions indicated.

Each of the coating compositions is drawn down on steel panels employed a 1 mil Bird applicator, passed under a 200 watt/inch medium pressure mercury vapor lamp for 3 passes at 20 fpm, and then baked at 150° C. for 5 minutes.

It is to be noted that the three compositions containing sulfolene catalyst in accordance with the present invention exhibit superior coating properties.

| Components | Parts By Weight | | | |
|---|---|---|---|---|
|  | 1 | 2 | 3 | 4 |
| Modified Alkyd Resin of Example II | 75.0 | 75.0 | 75.0 | 75.0 |
| Hexamethoxymethylmelamine | 12.5 | 12.5 | 12.5 | 12.5 |
| Sulfolene | 5.0 | 5.0 | 5.0 | — |
| Benzoin Ethyl Ether | — | 5.0 | — | — |
| Benzophenone | — | — | 5.0 | — |
| 50% p-Toluenesulfonic Acid in Ethanol | — | — | — | 10.0 |
| Tukon Hardness | 11.75 | 55.0* | 15.4 | 1.0 |
| Film Thickness (mils) | 1.0–1.5 | 0.2–0.4 | 0.8–1.0 | 0.8–1.0 |
| Gloss, 60° | 92.4 | 76.2 | 116.8 | 115.2 |
| Gloss, 20° | 54.2 | 27.4 | 76.8 | 89.2 |

*Extreme hardness probably attributable to low film thickness.

EXAMPLE VI

Preparation Of Aminoplast/Alkyd Compositions Containing An Acrylate Monomer

In the manner of Example V, the following aminoplast/alkyd resin coating compositions are prepared and drawn down on steel panels.

Composition Number 7 containing sulfolene catalyst and trimethylolpropane triacrylate monomer in accordance with the present invention exhibits exceptional Tukon hardness in comparison with the other compositions illustrated. Sulfolane, for example, is ineffective as a catalyst as compared to sulfolene.

| Components | Parts By Weight | | | |
|---|---|---|---|---|
|  | 5 | 6 | 7 | 8 |
| Modified Alkyd Resin of Example II | 75.0 | 75.0 | 75.0 | 75.0 |
| Hexamethoxymethylmelamine | 12.5 | 12.5 | 12.5 | 12.5 |
| Trimethylolpropanetriacrylate | 12.5 | 12.5 | 12.5 | 12.5 |
| Benzophenone | 5.0 | 5.0 | 5.0 | 5.0 |
| Sulfolane | — | 5.0 | — | — |
| Sulfolene | — | — | 5.0 | — |
| Hexachloroethane | — | — | — | 5.0 |
| Tukon Hardness | 0.9 | 2.35 | 15.0 | 5.8 |

When the coating procedure is repeated, but without exposure of the coatings to actinic light, the following Tukon hardness is observed for the respective coatings.

|   | 5 | 6 | 7 | 8 |
|---|---|---|---|---|
| Tukon Hardness | Tacky | 1.0 | 2.3 | Tacky |

As is noted, without prior exposure to actinic light, essentially no curing of the coatings is effected by the 150° C. baking cycle.

EXAMPLE VII

This Example demonstrates the thermal stability of a present invention composition containing a sulfolene compound as an acid-hardening catalyst.

| | Parts By Weight | |
|---|---|---|
| Components | 9 | 10 |
| Modified Alkyd Resin of Example II | 75.0 | 75.0 |
| Hexamethoxymethylmelamine | 12.5 | 12.5 |
| Sulfolene | 5.0 | — |
| 50% p-Toluenesulfonic Acid in Ethanol | — | 10.0 |

Each sample was stored in a glass jar in an oven at 120° F. and observed at 24-hour intervals.

|   | 9 | 10 |
|---|---|---|
| Stability, Gel Time, Days | >10 | 2-3 |

What is claimed is:

1. An acid-hardening resin composition which is activated by exposure to actinic light, said composition comprising a blend of (1) condensation polymerizable aminoplast; (2) condensation polymerizable alkyd resin; and (3) a sulfolene catalyst.

2. A condensation polymerizable coating composition comprising a blend of (1) an aminoplast; (2) alkyd resin; (3) a sulfolene catalyst; and (4) a photoinitiator.

3. A condensation polymerizable coating composition comprising a homogeneous liquid blend of (1) between about 20 and 50 weight percent of aminoplast or aminoplast precursor, (2) between about 50 and 80 weight percent of residual hydroxy-containing alkyd resin, (3) between about 0.5 and 15 weight percent of a sulfolene catalyst; and (4) between about 0.1 and 10 weight percent of a photoinitiator; based on total aminoplast/alkyd resin weight.

4. A condensation polymerizable coating composition in accordance with claim 3 wherein the aminoplast or aminoplast precursor is selected from condensation products of aldehyde with melamine, urea, dicyandiamide and benzoquanamine, and mixtures and etherified derivatives of the condensation products.

5. A condensation polymerizable coating composition in accordance with claim 3 wherein the composition contains as an additional component between about 2 and 30 weight percent of polymerizable olefinically unsaturated monomer or prepolymer, based on total aminoplast/alkyd resin weight.

6. A condensation polymerizable coating composition in accordance with claim 5 wherein the olefinically unsaturated monomer or prepolymer is an $\alpha,\beta$-olefinically unsaturated carboxylate ester of trimethylolpropane.

7. A condensation polymerizable coating composition in accordance with claim 5 wherein the olefinically unsaturated monomer or prepolymer is an $\alpha,\beta$-olefinically unsaturated carboxylate ester of pentaerythritol.

8. A condensation polymerizable coating composition in accordance with claim 5 wherein the olefinically unsaturated monomer or prepolymer is an $\alpha,\beta$-olefinically unsaturated carboxylate ester of glycerol.

9. A method of applying a protective film to a substrate which comprises the steps of (1) coating the substrate surface with the acid-hardening resin composition of claim 3, and (2) exposing the coated surface to actinic light to activate the condensation polymerization between the aminoplast and alkyd components.

10. A process for preparing a hard glossy film which comprises (1) casting the acid-hardening resin composition of claim 3 on a substrate surface, (2) irradiating the cast resin composition with ultraviolet light, and (3) accelerating the curing of the resin composition by heat treatment.

* * * * *